United States Patent [19]

Kraemer et al.

[11] Patent Number: 5,191,868
[45] Date of Patent: Mar. 9, 1993

[54] FUEL INJECTION PUMP FOR INTERNAL COMBUSTION ENGINES HAVING A LOAD-AND/OR RPM-DEPENDENT INJECTION COURSE

[75] Inventors: Manfred Kraemer, Schwieberdingen; Johann Warga, Bietigheim-Bissingen, both of Fed. Rep. of Germany

[73] Assignee: Robert Bosch GmbH, Stuttgart, Fed. Rep. of Germany

[21] Appl. No.: 806,512

[22] Filed: Dec. 13, 1991

[30] Foreign Application Priority Data

Jan. 4, 1991 [DE] Fed. Rep. of Germany ....... 4100093

[51] Int. Cl.⁵ .................. F02M 37/04; F02M 41/00
[52] U.S. Cl. ..................................... 123/449; 123/503
[58] Field of Search .............. 123/500, 501, 449, 503, 123/446, 447

[56] References Cited

U.S. PATENT DOCUMENTS

| | | |
|---|---|---|
| 3,421,486 | 1/1969 | Parrish, Jr. ................. 123/449 |
| 4,409,939 | 10/1983 | Eheim et al. ................. 123/449 |
| 4,587,940 | 5/1986 | Schmid ....................... 123/500 |
| 4,706,626 | 11/1987 | Häfele et al. ................. 123/503 |
| 4,708,114 | 11/1987 | Guntert et al. ................ 123/500 |
| 4,711,221 | 12/1987 | Laufer ....................... 123/449 |
| 4,721,442 | 1/1988 | Tanaka ....................... 123/503 |
| 4,830,587 | 5/1989 | Guntert et al. ................ 123/500 |
| 4,924,833 | 5/1990 | Höfer et al. .................. 123/449 |
| 4,964,789 | 10/1990 | Schueler et al. ............... 123/503 |

FOREIGN PATENT DOCUMENTS

| | | |
|---|---|---|
| 261156 | 9/1987 | European Pat. Off. . |
| 3429128 | 2/1986 | Fed. Rep. of Germany ...... 123/449 |
| 0102423 | 8/1979 | Japan ......................... 123/449 |
| 0075953 | 6/1981 | Japan ......................... 123/449 |
| 0222967 | 12/1983 | Japan ......................... 123/503 |
| 0018242 | 1/1984 | Japan ......................... 123/503 |
| 0203862 | 11/1984 | Japan ......................... 123/503 |
| 1027426 | 7/1983 | U.S.S.R. ..................... 123/503 |
| 2058947 | 4/1981 | United Kingdom ............... 123/503 |

Primary Examiner—E. Rollins Cross
Assistant Examiner—Thomas N. Moulis
Attorney, Agent, or Firm—Edwin E. Greigg; Ronald E. Greigg

[57] ABSTRACT

A fuel injection pump for internal combustion engines with a load- and/or rpm-dependent injection course formed by a reciprocating fuel control slide and a piston pump. The piston includes oppositely disposed slits and the reciprocating control slide has a graduated recess on its lower edge oriented toward the pump piston control slits, or the lower edges of the control slits are given a suitable geometry for fuel control.

13 Claims, 4 Drawing Sheets

FUEL INJECTION PUMP FOR INTERNAL COMBUSTION ENGINES HAVING A LOAD-AND/OR RPM-DEPENDENT INJECTION COURSE

BACKGROUND OF THE INVENTION

The invention is based on a fuel injection pump as defined hereinafter.

In reciprocating slide pumps of this kind, known for instance from European Patent Document 0 261 156 A1, the quantity and injection onset control are effected by the control of conduits by way of which the pump work chamber can be made to communicate with the suction chamber of the pump, namely by the association of control edges located on the pump piston with control edges located on the control slide.

This kind of fuel injection pump, which is predominantly used in so-called in-line reciprocating pumps of multicylinder engines, is known per se.

It is also known that an essential influence on economy and on the mixture and exhaust emissions of direct-injection utility vehicle Diesel engines is exerted by the fuel injection onset and injection duration, which must be adhered to exactly. The increased injection pressures that are necessary, because of the requisite high moment to be transmitted by the injection adjuster, to achieve a short injection duration with good fuel atomization make increasingly stringent demands of this drive element. At the same time, a need also exists for a wider adjusting range and a more compact structure. Conventional mechanical injection timing adjusters are often unable to fully meet these demands; particularly in unsteady operation, the results are an unsatisfactory response and unstable operating states.

ATZ (Automobiltechnische Zeitschrift) [Automotive Engineering Journal] 91 1989, pp. 628 ff. attains this object, in conventional pumps, by providing that the pump piston is provided on its side toward the pressure chamber with a defined polished section; as a result, the rpm-dependent prefeeding phase is reinforced and utilized for adjusting the supply onset and correcting the course of fuel quantity.

Temperature-dependent triggering this generic type of reciprocating slide is effected by black/white triggering of the reciprocating slide as a function of the cold-starting and warmup phases. Beyond this control, however, for the reasons given above, it is also desirable to assure a load- and rpm-dependent adjustment of the injection onset by the simplest possible means.

OBJECT AND SUMMARY OF THE INVENTION

The fuel injection pump according to the invention has an advantage over known reciprocating slide pumps that by embodying the transitions of the pump piston control slits in a manner according to the invention relative to the transition itself in the reciprocating slide, and by especially embodying its lower edge, such hydraulic conditions in the so-called supply stroke are created that rpm- and load-dependent adjustment of supply onset is attained.

A further advantage of the invention is that the proposed recesses on the reciprocating slide, and/or the corresponding embodiment of the pump piston control slits that correspond with the lower edge of the reciprocating slide, are very economical to manufacture, and in this way, by simple means, a version for reciprocating slide pumps has been discovered that enables load- and rpm-dependent adjustment of the supply onset, without additional expensive control and regulating systems, while simultaneously maintaining the known temperature-dependent control in the cold-starting and warmup phases of the engine, for instance.

Besides the main provision of a graduated recess in the underside of the reciprocating slide, the invention has other advantageous features. One such feature provides that the graduated recess is given a variable depth along its circumference, and in another advantageous feature, this depth is defined such that it has a continuous, and in particular optionally constant, rise. The rise angle $\alpha$ to be adhered to can be defined by experimental adaptation to the particular pump type and the desired adjustment of supply onset, and the depth of the recess can be defined per se.

In another advantageous feature, the lower edge of the control slits in the pump piston that are the last to correspond with the reciprocating slide edge in the supply stroke is adapted, in terms of the angular position of this edge, to the inclination and geometry of the reciprocating slide edge. It is also within the scope of this invention to embody these control slit edges of the pump piston with arbitrary, and in particular rounded, geometry. According to the invention, this can be done in particular by erosion, with uniform removal of material of the pump piston.

In all the embodiments mentioned, shaping of the course of injection and of the supply onset is attained; as a result, economical variations of the known reciprocating slide pump with a mechanical governor are disclosed.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 5 and 5b show a variant embodiment of FIGS. 4 and 4a with a rectangular lower edge on the control slit in which FIG. 5b is taken along line 5b—5b of FIG. 5.

DESCRIPTION OF THE PREFERRED EMBODIMENTS

Figure 1:
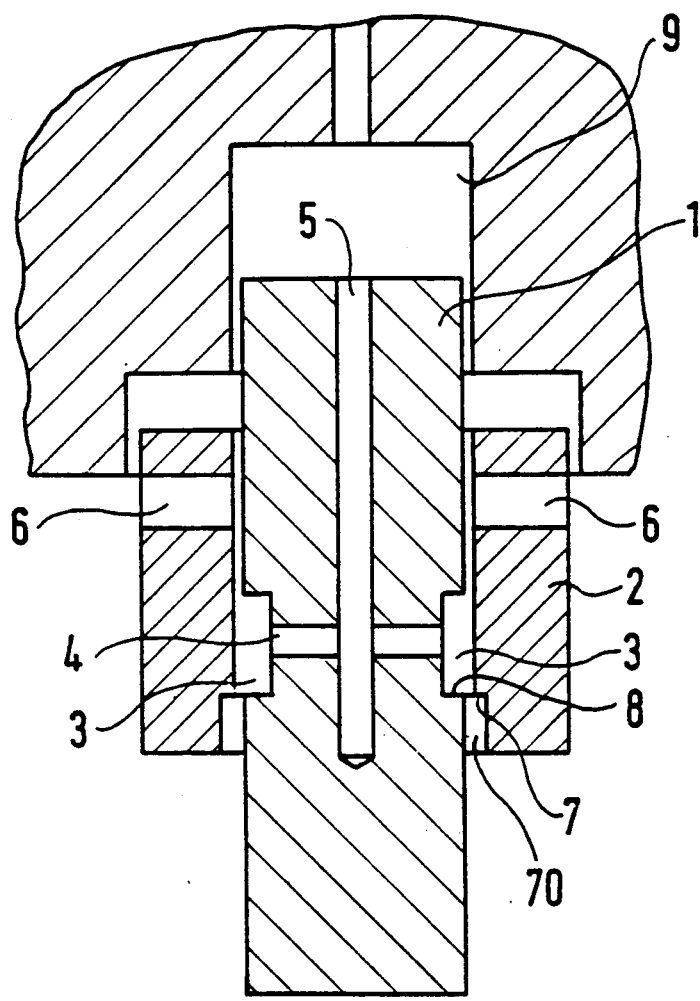
FIG. 1 is a longitudinal section through the parts of the injection pump applicable to the invention, namely the reciprocating slide and the pump piston.

In the variant, shown in FIG. 1, of the exemplary embodiment the structural unit of a pump element formed of a fragment of a reciprocating-rotating pump piston 1 and the reciprocating fuel control slide 2 is shown. This structural unit is inserted in a known manner into a cylinder liner, which in turn is inserted into a fuel injection pump housing, in which the pump piston 1 is set into reciprocating motion via a camshaft, counter to the force of a spring, not shown. FIG. 1 shows a recess in the bottom end of the fuel control slide in the form of a stepped bore, the piston includes oppositely disposed control slits 3 formed in the surface of the pump piston with the upper and lower ends parallel with the axis of the piston with the ends of the slits displaced circumferentially. The slits extend obliquely from the upper end to the lower end of the slit circumferentially. A transverse bore 4 in the piston joins the slits 3 and is intersected by an axial blind bore 5 that communicates with a pump work chamber 9 at the upper end of the piston and a diversion bore 6 is formed in the reciprocating slide 2.

Figure 2:
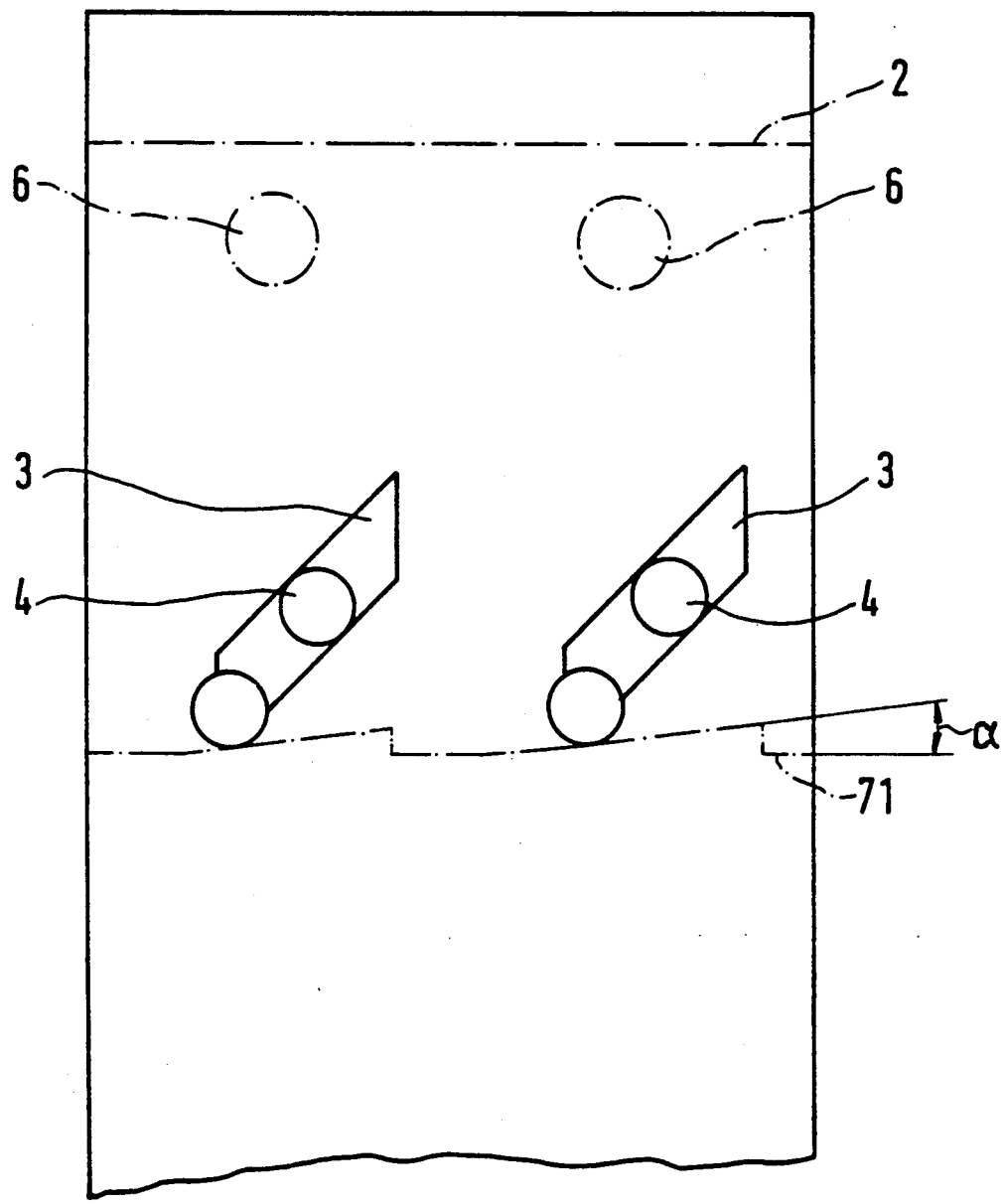
FIG. 2 shows a developed view of the pump piston and reciprocating slide recess, with a crown-shaped lower edge of the reciprocating slide.
Figure 3:
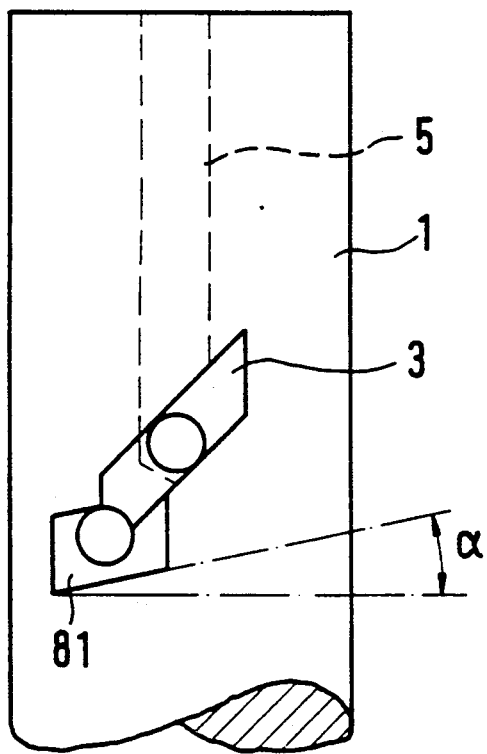
FIG. 3 shows an embodiment of the lower edge of a control slit in the pump piston having an angle $\alpha$ adapted to the recess of the reciprocating slide.
Figure 4:
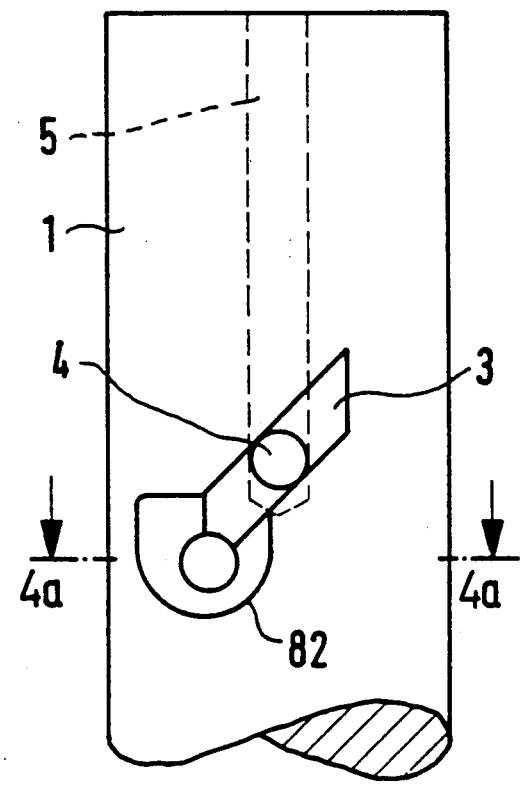
FIGS. 4 and 4a show an embodiment of the lower edge of a control slit in the pump piston in a rounded version with a plan view as shown in FIG. 4a which is taken along line 4a—4a of FIG. 4.
Figure 4A:
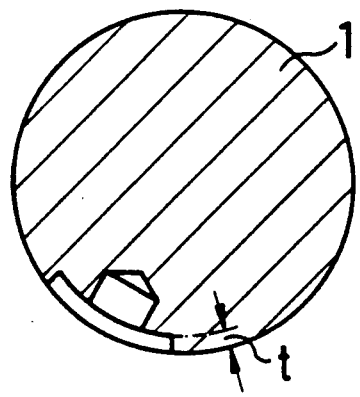
Figure 5:
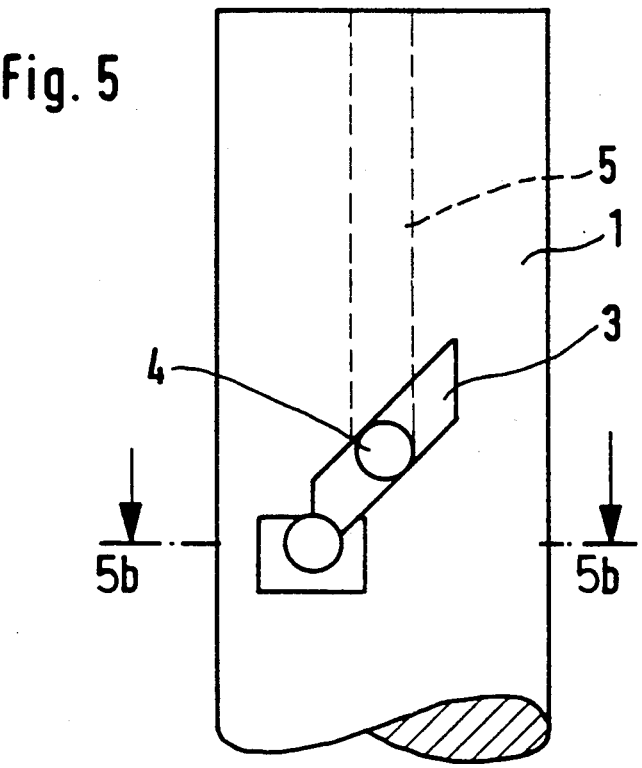
Figure 5B:
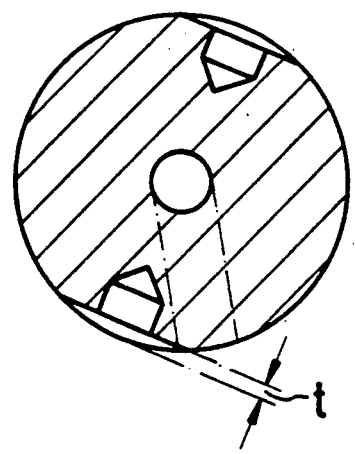

In the position shown in FIG. 2 of the fuel control slide 2, the recess 7 in the reciprocating fuel control slide 3 and of the lower edges of the control slits in the pump piston, the closure between the high-pressure chamber 9 and suction chamber of the pump is just now occurring in the supply stroke of the pump piston 1. In other words, in this position, at low rpm the supply onset is just beginning, while at high rpm the supply is already in high gear. The hydrodynamic conditions at the aforementioned edges can be varied by employing the variants of the different shaped slits of the exemplary embodiments shown in the other drawing figures. Thus FIG. 2 shows not only the development of the pump piston 1 but also a crown-shaped lower edge 71 of the reciprocating fuel control slide 2. As shown in FIG. 2, in broken lines, the recess 71 is graduated over the circumference of the piston and is given a variable depth in the direction of reciprocation of the pump piston. Contrarily, in FIGS. 3 and 4, possible embodiments of the lower edges of the control slits 3 in the pump piston are shown, in particular characterized by the lower edge rims 81 and 82, with the rim 81 being embodied at an angle corresponding to the angle α of FIG. 2 and the rim 82 being embodied in rounded form.

All the variants of the invention given here can be combined with one another as needed, depending on the specific pump type and in accordance with the desired adjustment of supply onset, and thus are essential to the invention both individually and in any arbitrary combination. In each case, they effect the desired rpm-dependent supply onset adjustment, dictated by complicated hydrodynamic effects at the edges claimed.

The foregoing relates to a preferred exemplary embodiment of the invention, it being understood that other variants and embodiments thereof are possible within the spirit and scope of the invention, the latter being defined by the appended claims.

List of reference numerals 1 pump piston
2 reciprocating slide
3 control slits in the pump piston
4 transverse bore
5 blind bore
6 diversion bores in the reciprocating slide
7 lower edge of the reciprocating slide
70 recess in reciprocating slide
71 crown-shaped recess in the lower edge of the reciprocating slide
8 lower edge of the control slit in the pump piston
81 lower edge rim of the control slits at an angle α
82 lower edge rim of the control slits in the rounded version
9 pump work chamber

What is claimed and desired to be secured by Letters Patent of the United States is:

1. A fuel injection pump in a pump housing for internal combustion engines with a load and rpm-dependent injection course and at least one pump piston, a pump cylinder which is embodied as a cylinder liner is fixed in a suitable bore of the pump housing and the pump piston (1) is driven for a reciprocating drive stroke and is optionally rotatable for controlling fuel, and at least one slide (2) located inside a recess of the cylinder liner on the pump piston (1), the at least one slide being axially displaceable on the pump piston (1) in order to control fuel flow, the pump piston includes control slits (3) in an outer surface and the at least one slide (2) includes on a lower edge (7) a graduated recess (70, 71) oriented toward the pump piston, and the pump piston (1) has a throttling control location on a lower edge (81, 82) of the control slits (3).

2. A fuel injection pump as defined by claim 1, in which the graduated recess (71) is embodied symmetrically with respect to the pump piston (1), and transverse control openings (4) in said pump piston in such a manner that over the circumference of the piston the graduated recess is given a variable depth in the direction of reciprocation of the pump piston (1).

3. A fuel injection pump as defined by claim 1, in which the graduated recess (71) has a depth variation which is effected with double symmetry with a maximum variable depth of the graduated recess (71) being defined by a constant inclination with a predetermined angle (α).

4. A fuel injection pump as defined by claim 2, in which the graduated recess (71) with depth variation is effected with double symmetry with a maximum variable depth of the recess (71) being defined by a constant inclination with a predetermined angle (α).

5. A fuel injection pump as defined by claim 1, in which the control slit lower edge (81) that is ground into the pump piston (1) and corresponds to the lower edge (7) of the at least one slide (2) is likewise provided at an angle that corresponds to the angle α of the recess (70) in the reciprocating slide (2).

6. A fuel injection pump as defined by claim 2, in which the control slit lower edge (81) that is ground into the pump piston (1) and corresponds to the lower edge (7) of the at least one slide (2) is likewise provided at an angle that corresponds to the angle α of the recess (70) in the reciprocating slide (2).

7. A fuel injection pump as defined by claim 3, in which the control slit lower edge (81) that is ground into the pump piston (1) and corresponds to the lower edge (7) of the at least one slide (2) is likewise provided at an angle that corresponds to the angle α of the recess (70) in the reciprocating slide (2).

8. A fuel injection pump as defined by claim 4, in which the control slit lower edge (81) that is ground into the pump piston (1) and corresponds to the lower edge (7) of the at least one slide (2) is likewise provided at an angle that corresponds to the angle α of the recess (70) in the reciprocating slide (2).

9. A fuel injection pump as defined by claim 1, in which the graduated recess (71) with depth variation is effected doubly symmetrically opposite one another on the control slide (2) in the direction of reciprocation, wherein a maximum penetration depth, with respect to a horizontal, plane graduated recess, is attained by means of a rising path, a tangent of which forms a predetermined angle α.

10. A fuel injection pump as defined by claim 2, in which the graduated recess (71) with depth variation is effected doubly symmetrically opposite one another on the control slide (2) in the direction of reciprocation, wherein a maximum penetration depth, with respect to a horizontal, plane graduated recess, is attained by means of a rising path, a tangent of which forms a predetermined angle $\alpha$.

11. A fuel injection pump as defined by claim 1, in which said slits (3) include rounded form control slit lower edges (82) in the pump piston (1) produced by erosion to a uniform depth that during a supply stroke are the last ones to correspond with the at least one slide (2).

12. A fuel injection pump in a pump housing for internal combustion engines with a load and rpm-dependent injection course and at least one pump piston, a pump cylinder which is embodied as a cylinder liner is fixed in a suitable bore of the pump housing and the pump piston (1) is driven for a reciprocating drive stroke and is optionally rotatable for controlling fuel, and at least one slide (2) located inside a recess of the cylinder liner on the pump piston (1), the at least one slide being axially displaceable on the pump piston (1) in order to control fuel flow, the pump piston includes control slits (3) in an outer surface and the pump piston (1) has a throttling control location on a lower edge (81, 82) of the control slits (3).

13. A fuel injection pump in a pump housing for internal combustion engines with a load dependent injection course and at least one pump piston, a pump cylinder which is embodies as a cylinder liner is fixed in a suitable bore of the pump housing and the pump piston (1) is driven for a reciprocating drive stroke and is optionally rotatable for controlling fuel, and at least one slide (2) located inside a recess of the cylinder liner on the pump piston (1), the at least one slide being axially displaceable on the pump piston (1) in order to control fuel flow, the pump piston includes control slits (3) in an outer surface and the at least one slide (2) includes on a lower edge (7) with a graduated recess (70, 71) oriented toward the pump piston, and the pump piston (1) has a throttling control location on a lower edge (81, 82) of the control slits (3).

* * * * *